Inventor
Gordon E. Bradt.
By Hill, Sherman, Meroni, Gross & Simpson
Attys

Inventor
Gordon E. Bradt
By Hill, Sherman, Meroni, Gross & Simpson
Attys

Aug. 8, 1967 G. E. BRADT 3,334,831

TRANSPORT SYSTEM FOR LIMP MAGNETIC TAPES

Filed Aug. 10, 1964

4 Sheets-Sheet 3

Inventor.
Gordon E. Bradt.

By Hill, Sherman, Meroni, Gross & Simpson
Attys

TRANSPORT SYSTEM FOR LIMP MAGNETIC TAPES

Filed Aug. 10, 1964

4 Sheets-Sheet 4

Inventor
Gordon E. Bradt.

By Hill, Sherman, Meroni, Gross & Simpson Attys

3,334,831
TRANSPORT SYSTEM FOR LIMP MAGNETIC TAPES

Gordon E. Bradt, Wilmette, Ill., assignor to Bell & Howell Company, Chicago, Ill.

Filed Aug. 10, 1964, Ser. No. 388,474
18 Claims. (Cl. 242—55.13)

The present invention relates to tape handling methods and apparatus and more specifically relates to an improved automatic threading assembly for magnetic recorders, particularly those employing limp magnetic tapes. The invention also relates to improvements in the field of tape storage, handling and transport and to containers for storage and protection of reels of such tape.

It is common today to find magnetic tapes made of extremely thin material, for example, composed of a thin ribbon of "Mylar" plastic or the like measuring 1 mil or less in thickness. Such extremely thin tapes are difficult to handle and transport through a tape handling apparatus such as a magnetic recording and reproducing assembly because of their extreme limpness, in contrast to the heavier, relatively stiffer tapes which have heretofore been employed or in contrast to film handling and transport apparatus in the photographic arts. The present invention provides a unique method and system for handling such tapes, and, in particular, for automatically threading the tape from a supply reel on which the tape is coiled through the operative mechanism of a magnetic recorder-reproducer assembly, and onto a take-up reel upon which the tape is to be wound.

Automatic threading mechanisms have been developed in recent years, but none so far has found wide commercial acceptance. Many of these automatic threading mechanisms make use of relatively stiff leaders, requiring a special type of tape to be purchased, or at least the attachment of the special leader onto the end of the tape. Furthermore, these mechanisms which have been employed for automatic threading are frequently quite complex and add a substantial amount to the cost of the machine.

It has heretofore been suggested to employ a limp tape driving mechanism operated by air pressure differential. However, there is required a complete enclosure for the takeup reel, and a special guide surface consisting of a porous bearing material or the like over which the tape travels. This special type of surface is necessary in order to prevent any flapping of the tape during its drive, which might interfere, in that system, with the proper transport of the tape through the machine.

In another type of threading system for limp tape materials a supply reel is positioned adjacent to a vacuum enclosure, and the hub of the take-up reel is enclosed within a vacuum enclosure which provides a confined guide path for the tape. The tape guide path passes adjacent to a capstan and the electromagnetic transducer head. The take-up reel is provided with surface apertures which communicate it with a source of low pressure. The free outer end of the magnetic tape is subjected to a pulling force created by the air flow through the confined guide path past the capstan, the transducer, and the guide elements.

The system of the present invention eliminates many of the objectionable features of systems which have heretofore been used for threading relatively limp strip materials such as extremely thin magnetic tapes. In the system of the present invention, the limpness of the tape is actually used to advantage since in the devices of the present invention, the areodynamic properties of the limp tape, rather than the mechanical properties of the tape, control its movement through the magnetic reproducer and/or recorder assembly from supply reel to take-up reel.

It is an object of the present invention therefore to provide an automatic threading assembly for a tape handling and transport means which overcomes the deficiencies of the prior art.

An object of the present invention is to provide an improved transport system for limp tapes and the like employing directionally oriented air jets to direct the limp tape from the supply reel to the take-up reel.

Another object of the invention is to provide an improved tape threading system for a magnetic recorder-reproducer assembly having a series of air jets therein oriented and aligned to keep the tape coiled about the supply reel, and lead the leading end of the tape along a tape track through a guide means and onto a take-up reel.

Still another object of the invention is to provide an improved means for stripping off the leading end of a limp tape from a supply reel.

It is specifically contemplated by the present invention that a container be provided for coiled tape which can be advantageously used as a permanent storage enclosure and which will permit usage of the tape without physical removal of the tape reel.

Accordingly it is a further object of the invention to provide an improved container for a reel of magnetic tape which accommodates its use with the newly designed magnetic tape transport system and which can be used to store the tape for protection thereof in an aesthetically attractive container.

In general, the automatic threading system of the present invention includes a supply reel which has a coil of limp tape thereon, and a take-up reel arranged to receive the tape from the supply reel after the tape passes against the magnetic transducing head. Various air jet means are positioned along the assembly, including one or more jets which tend to keep the tape wrapped in a tight coil on the supply reel when the reel is rotated. These jets serve to wrap out any loose coils of tape which may appear on the supply reel. An additional air jet is provided to strip the leading end of the tape from the remaining convolutions of the tape when the supply reel is rotated in a direction in which it pays out tape. The limp tape is thereby directed toward a guide means, whereupon it is subjected to the action of a jet of air of relatively high mass and velocity which actually carries the tape along the guide means toward a portion thereof which then directs the end of the tape toward the hub of the take-up reel.

Another jet may be located appropriately if necessary to assist in directing the tape end toward the hub of the take-up reel. Finally, the tape is firmly secured about the take-up hub preferably with the aid of a reduced pressure system communicating with the take-up hub to hold the same firmly against the hub while the initial wrap around of the tape occurs.

A further description of the present invention will be made in conjunction with the attached sheets of drawings which illustrate the preferred embodiments thereof.

Although the principles of the present invention are generally applicable to any tape transport system a particularly useful application is found in a magnetic recorder and reproducer for use by non-professionals, for example, in the home.

Figure 1:
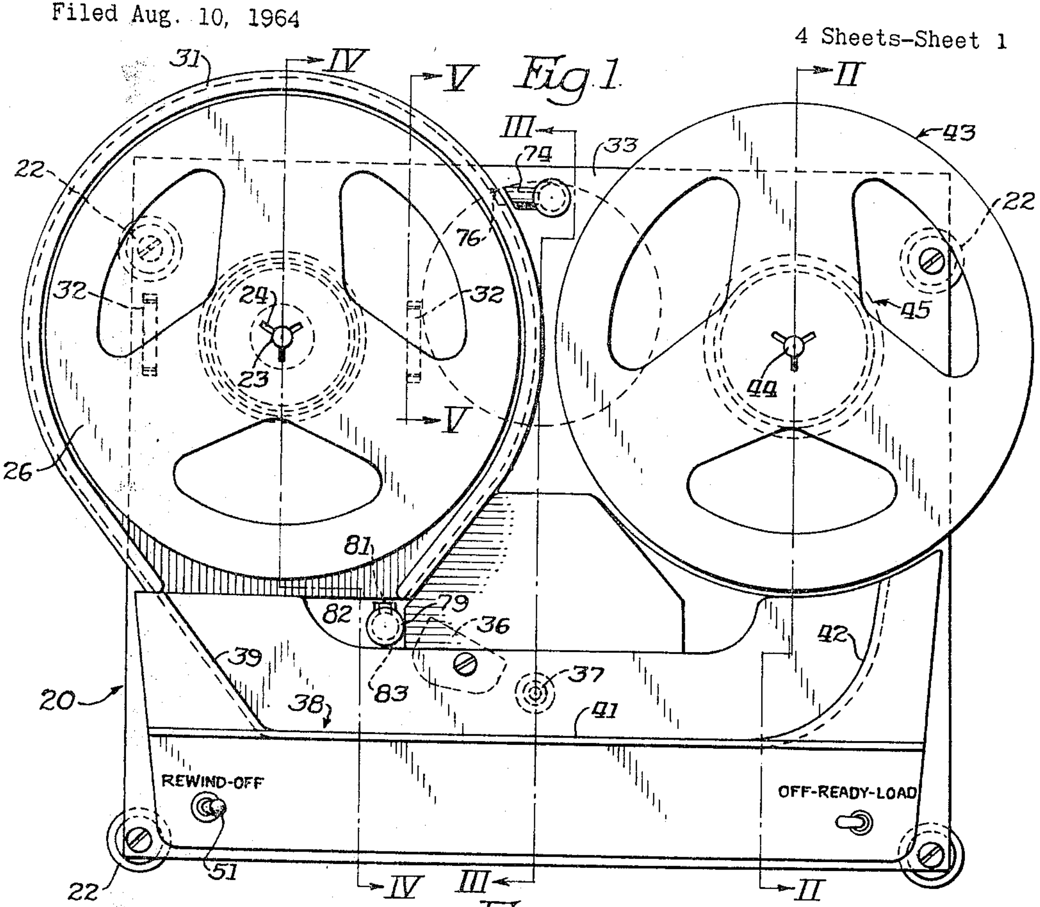
FIGURE 1 is a plan view of a magnetic recorder-reproducer assembly embodying the improvements of the present invention, with the tape being removed for purposes of clarity.

In FIGURE 1, reference numeral 20 indicates generally a magnetic recorder-reproducer assembly, including a base plate 21 supported on legs 22 extending from each corner of the frame. Rotatably supported from the frame is a reel spindle 23, having the usual radially extending lugs 24 extending therefrom, for receiving a conventional magnetic tape supply means, such as reel 26. The reel 26 may be of conventional design, and, as illustrated in FIGURE 4, may include a pair of spaced flanges 27 and 28 and a centrally disposed hub portion 29 having recesses therein which accommodate the lugs 24 on the spindle to provide a driving connection therebetween.

Figures 3, 5:
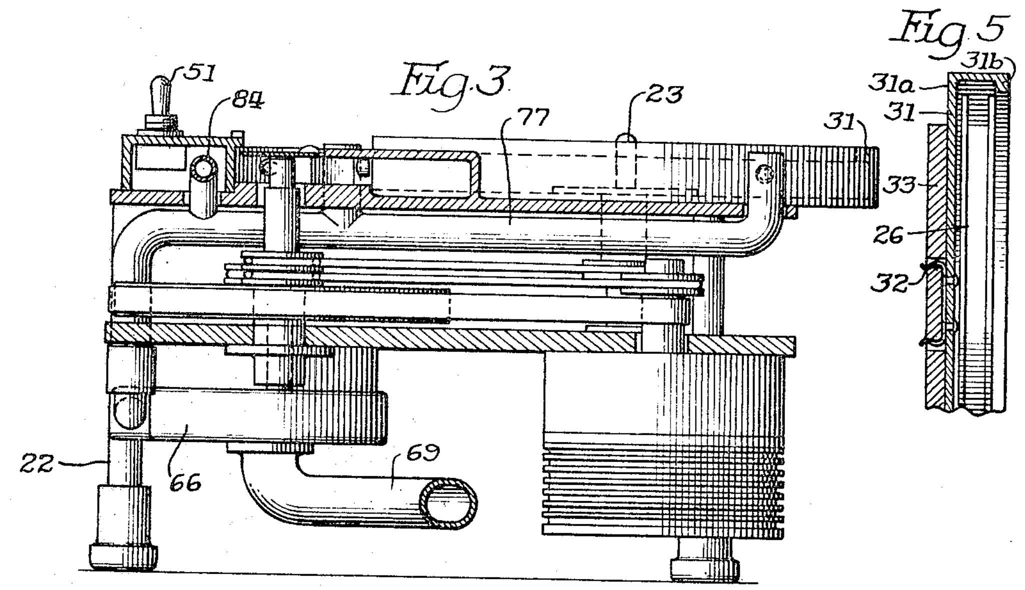
FIGURE 3 is a cross-sectional view taken substantially along the line III—III of FIGURE 1.
FIGURE 5 is a fragmentary cross-sectional view taken substantially along the line V—V of FIGURE 1.

In accordance with this invention means are provided to drive and control the tape pneumatically and to that end the supply reel 26 is enclosed within a removable rim or shroud or scroll 31 composed of a material such as a synthetic resin strip forming a baffle of generally U shaped configuration to direct the air streams utilized. The rim or scroll 31 is held in position by providing a pair of resilient fingers 32 which fit in snap-in assembly into suitable slots provided in the tape deck 33 of the machine. This construction is best illustrated in FIGURE 5 of the drawings. As also illustrated in that figure, the rim 31 has a pair of opposed flange portions 31*a* and 31*b* forming legs spaced sufficiently apart so that the reel 26 is loosely received therein, and a running space is provided between the reel 26 and the rim 31. The legs are joined by a wall portion 31*c* thereby to confine the air flow path provided by the various jets about the periphery of the coiled tape on the reel 26.

To complete the description of the elements shown in FIGURE 1, the tape deck carries a conventional magnetic transducer head 36 and a capstan 37. There is also provided an upstanding guide means 38 having an angular portion 39 forming an extension at one end of the rim 31, a straight run portion 41, and a generally arcuate portion 42 which directs the end of the limp tape toward the take-up means, such as a reel generally indicated at numeral 43 in the drawings.

Figures 2, 4:
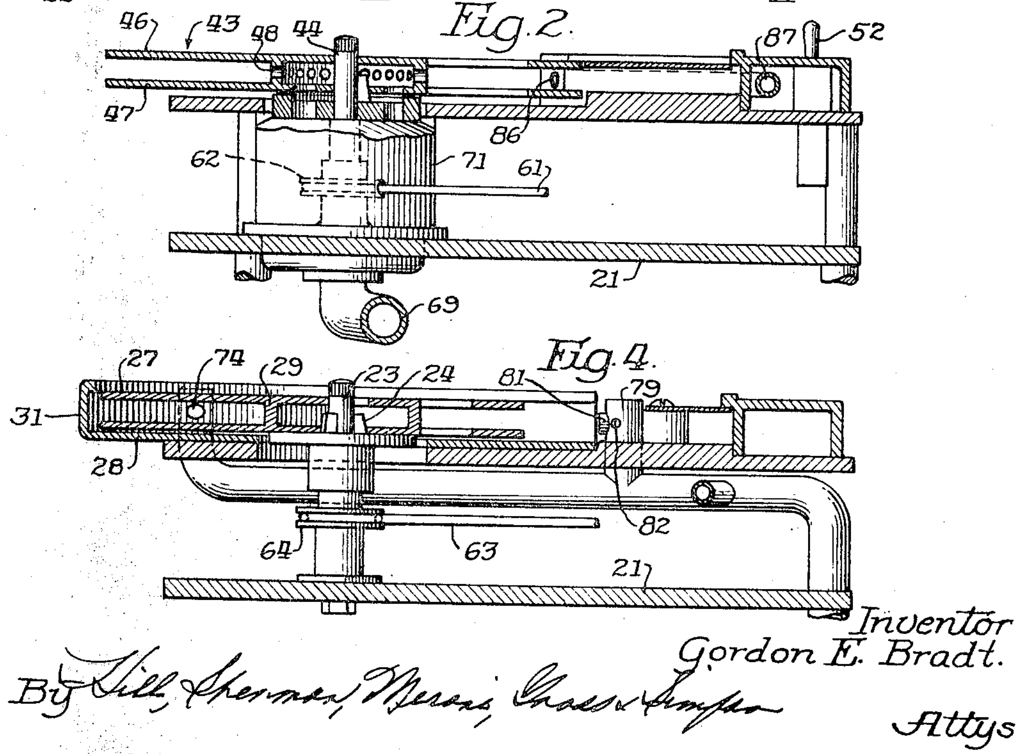
FIGURE 2 is a cross-sectional view taken substantially along the line II—II of FIGURE 1.
FIGURE 4 is a cross-sectional view taken substantially along the line IV—IV of FIGURE 1.
Figure 8:
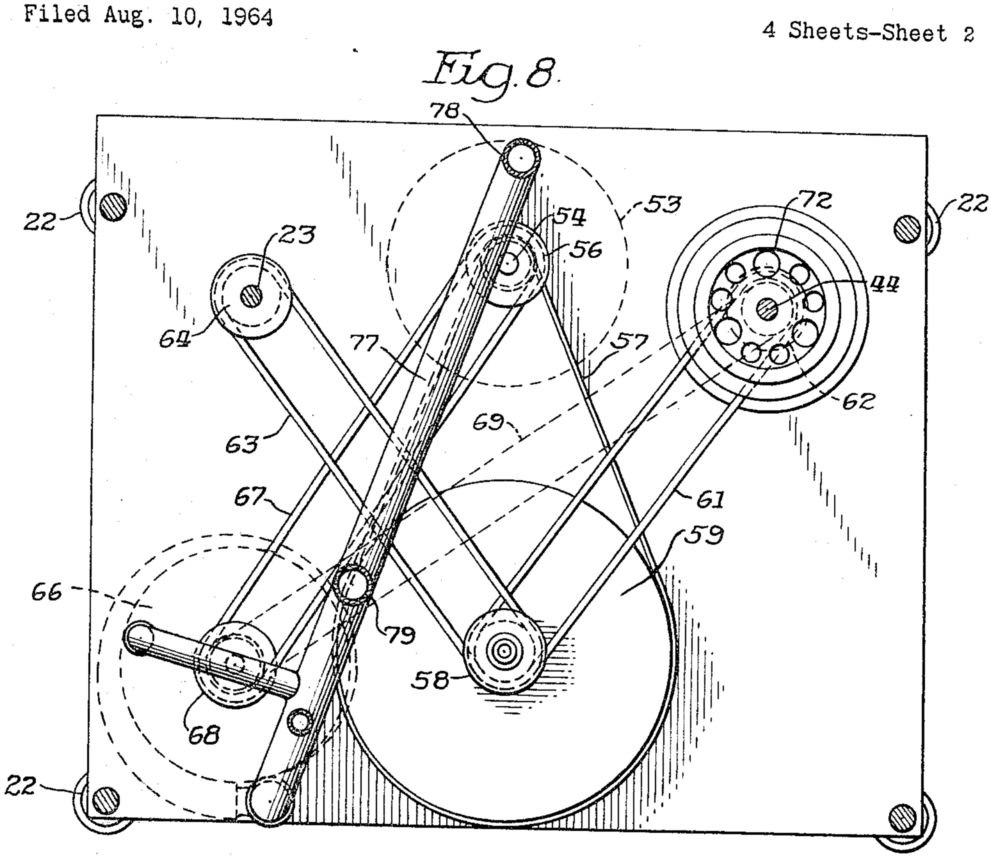
FIGURE 8 is a plan view of the elements of the assembly shown in FIGURES 1–7, with the reels and the tape deck removed to illustrate the underlying construction.
Figure 7:
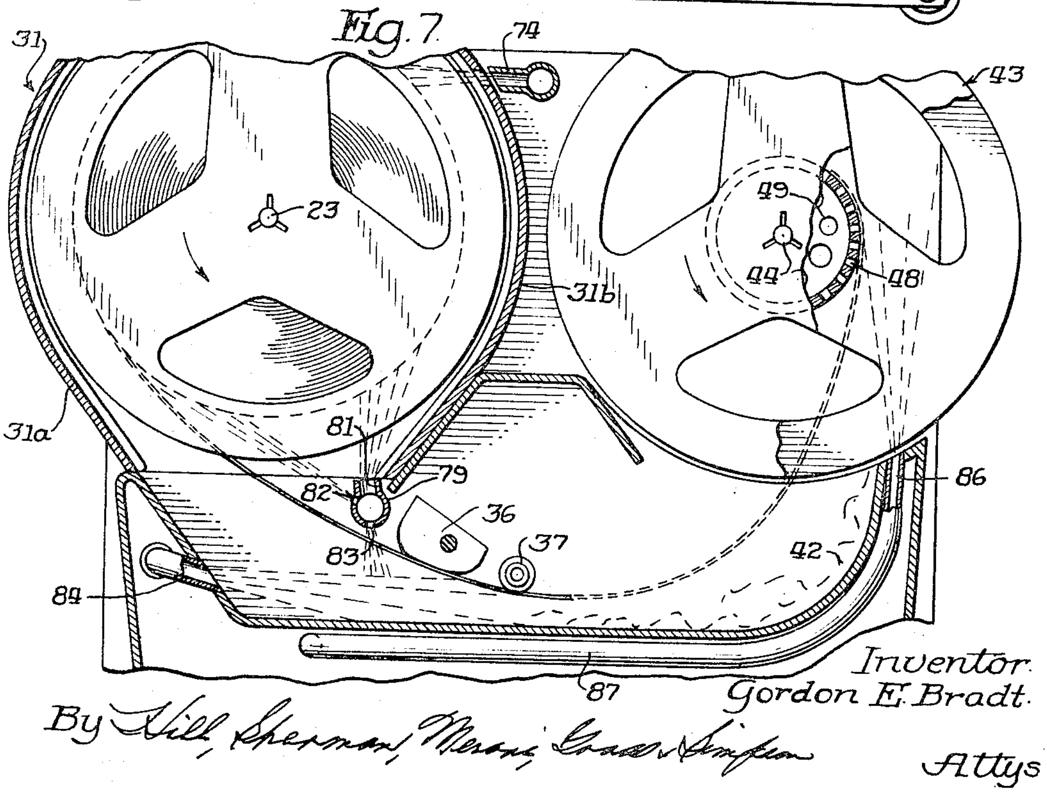
FIGURE 7 is a fragmentary view similar to FIGURE 6, but illustrating the position of the tape when it is first received about the hub of the take-up reel.

The take-up reel 43 is mounted on a spindle 44 and has a pair of opposed flange portions 46 and 47 on opposite sides of a hub 45 as best illustrated in FIGURE 2. The hub 45 of the take-up reel 43, however, is provided with a series of apertures 48 which communicate the hub to a source of vacuum bias or a source of reduced pressure thereby assisting in holding the end of the tape against the hub of the take-up reel 43. As best seen in FIGURE 7, the base of the hub portion has a plurality of apertures 49 therein in registry with suitable conduit means adapted to be connected to a source of reduced pressure.

As shown in FIGURE 1, the tape deck 33 also includes a "rewind-off" switch 51 for the purpose of reversing the operation of the motor when rewinding of the tape is desirable. Another switch 52 is provided on the tape deck to initiate the loading operation, the switch having a "ready" position as well as a "load" position.

The mechanical drive system for the exemplary assembly illustrated in FIGURES 2, 3, 4 and 8 may include a reversible motor 53 which drives the shaft 54 to which is secured a pulley 56. A belt 57 connects the pulley 56 with the rim of a relatively massive flywheel 59. A belt 61 off the flywheel 59 is connected to a pulley 62 on the take-up reel assembly, and drives the spindle 44. Similarly, a belt 63 connects the pulley 58 with a pulley 64 which provides the rotataive movement of the spindle 23.

The motor 53 also provides the motive power for a blower 66 by means of a belt 67 connecting the pulley 56 with a pulley 68 of the fan assembly. The intake side of the blower 66 is connected by means of a conduit 69 to a housing 71 (FIGURE 2) in which the pulley 62 is located. A plurality of apertures 72 (FIGURE 8) are arranged to be in registry with the apertures 49 of the take-up reel 43 and thereby provides the low pressure source for the hub 45 of the take-up reel in order to supply a vacuum bias thereto. The outlet side of the blower 66 functions as a source of air at increased pressure and is connected to a manifolding system including various conduits leading to separate nozzles.

In accordance with the invention a plurality of air jet means or orifices are oriented and aligned to direct separate jets against the tape. There is provided a first air jet orifice or nozzle 74 aligned to direct a jet stream $J_1$ of air from a source at increased pressure against the tape coiled on the supply reel 26. The orifice 74 is arranged to direct substantial components of the jet stream $J_1$ in a generally tangential direction thereby tending to circulate in a channel extending circumferentially between the scroll walls 31*a*, 31*b*, 31*c* and the tape on the reel 26. The rim or scroll 31 is provided with an aperture 76 in registry with the orifice 74 admitting the jet stream $J_1$ into the channel. The orifice 74 is connected to a manifold 77 (FIGURE 8) connected to the discharge side of the blower 66. A conduit 78 delivers the air from the manifold 77 to the orifice 74.

Additional air jets are provided from apertured nozzles suitably positioned in a nozzle head 79. An orifice 81 formed in the nozzle head 79 is positioned to direct a jet stream $J_2$ along the inner surface of the rim or scroll 31 to assist the air jet from the orifice 74 in training loose coils of tape around the supply reel 26 when the machine is in the "ready" condition. In this condition, the supply reel 26 is rotated in a clockwise direction as viewed in FIGURE 1.

In order to peel off the free end of the tap from the reel the nozzle head 79 is provided with another orifice 82 which may be quite small in dimension and projects a controlled jet of air $J_3$ substantially tangentially to the coil of tape trained about the supply reel 26. The jet of air $J_3$ emanating from the orifice 82 serves to separate or peel the leading end of the tape from the remaining windings or convolutions of the tape when the machine is in the "load" condition, and the supply reel 26 has begun to rotate in the counterclockwise or unwinding direction.

Figure 6:
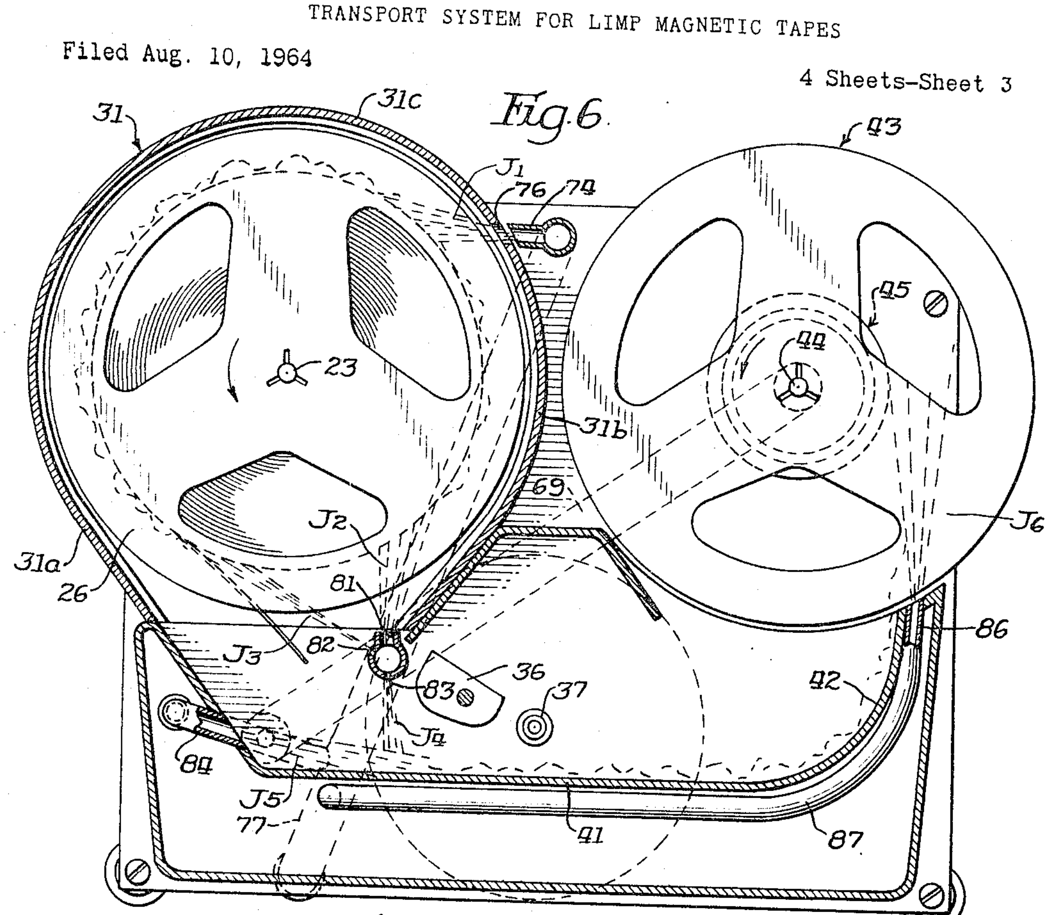
FIGURE 6 is a plan view of the assembly illustrating the manner in which the air jets operate upon initial peeling of the tape from the supply reel.

A third orifice 83 formed in the nozzle head 79 is positioned to direct a stream of air $J_4$ at the inside surface of the tape and urge it toward the substantially flat surface 41 of the guide 38. The position of the elements and the multiple air streams just at the moment of unpeeling the forward end of the tape is illustrated in FIGURE 6 of the drawings.

In order to propel the free end of the tape transversely across the tape deck past the transducer head 36 a jet stream is directed through a nozzle head 84 positioned to direct a strong current or stream of air $J_5$ substantially along the relatively flat guide surface 41 thereby to suspend the relatively limp tape in a high velocity stream.

The nozzle head 84 is sized so that the mass velocity of the air is sufficiently high so that it effectively propels the tape along the path and projects it to or towards the arcuate surface 42 constituting the terminating end of the guide 38.

The arcuate guide surface 42 tends to operate as a baffle for changing the direction of the air jets flowing along the surface 41. The tape may be assisted in moving towards the hub 45 of the take-up reel 43 by the provision of another jet stream emanating from a nozzle head 86 connected to the manifold 77 by means of a conduit 87. As best seen in FIGURE 6, the nozzle head 86 is positioned so that a jet stream $J_6$ directs the leading end of the limp tape into the hub of the take-up reel 43 where the reduced pressure conditions existing at the surface of the hub 45 exert a vacuum bias against the tape end firmly engaging the tape against the hub 45 and the winding operation will start. The position of the elements at the start of the wind-up at the take-up reel is best illustrated in FIGURE 7 of the drawings.

The plural jet streams $J_1$–$J_6$ in effect constitute a loci of spaced points prescribing the path through which the tape is to be directed. By suspending the free end of the tape in the plural jets an action somewhat comparable to that occurring when a flag stands out from a staff is produced, i.e. a positive biasing force urges the free end of the tape along the prescribed path.

In operation, when switch 52 is placed on the "ready" position, the motor 53 operates to drive the supply reel 26 in a clockwise direction, and the blower functions to direct the jet streams at the periphery of the tape, particularly through the orifices 74 and 81. This serves to wind up any loose coils of tape that may have existed on the reel. Then, when the switch 52 is set to the "load" position, the direction of rotation of the motor is reversed and the supply reel 26 starts to feed or pay out tape as illustrated in FIGURE 6 of the drawings. The jet from the orifice 82 serves to strip or peel the leading end of the tape from the reel. Then, the velocity stream from the nozzle 84 picks up the tape and propels it along the guide surface 41. The tape is then directed against or towards the arcuate guide surface 42 whereupon the re-directed stream of air and the jet stream from the nozzle 86 serves to direct it toward the hub 45 of the take-up reel 43. The pressure gradient at the apertures 48 is effective to pressure bias and hold the end of the tape firmly against the hub 45, as illustrated in FIGURE 7 until one or more convolutions are wound around the hub. When this occurs, the slack is taken out of the tape, and it is relatively tautly received and loaded against the electromagnetic transducer head 36, and the capstan 37 thereby automatically conditioning the tape for proper performance as a magnetic tape medium. When a significant amount of tension is provided in the tape from a suitable recording or reproducing on the tape, the blower 66 may be turned off, for example by means of an automatic switch responsive to the tension in the tape.

Figures 9, 10, 11, 12:
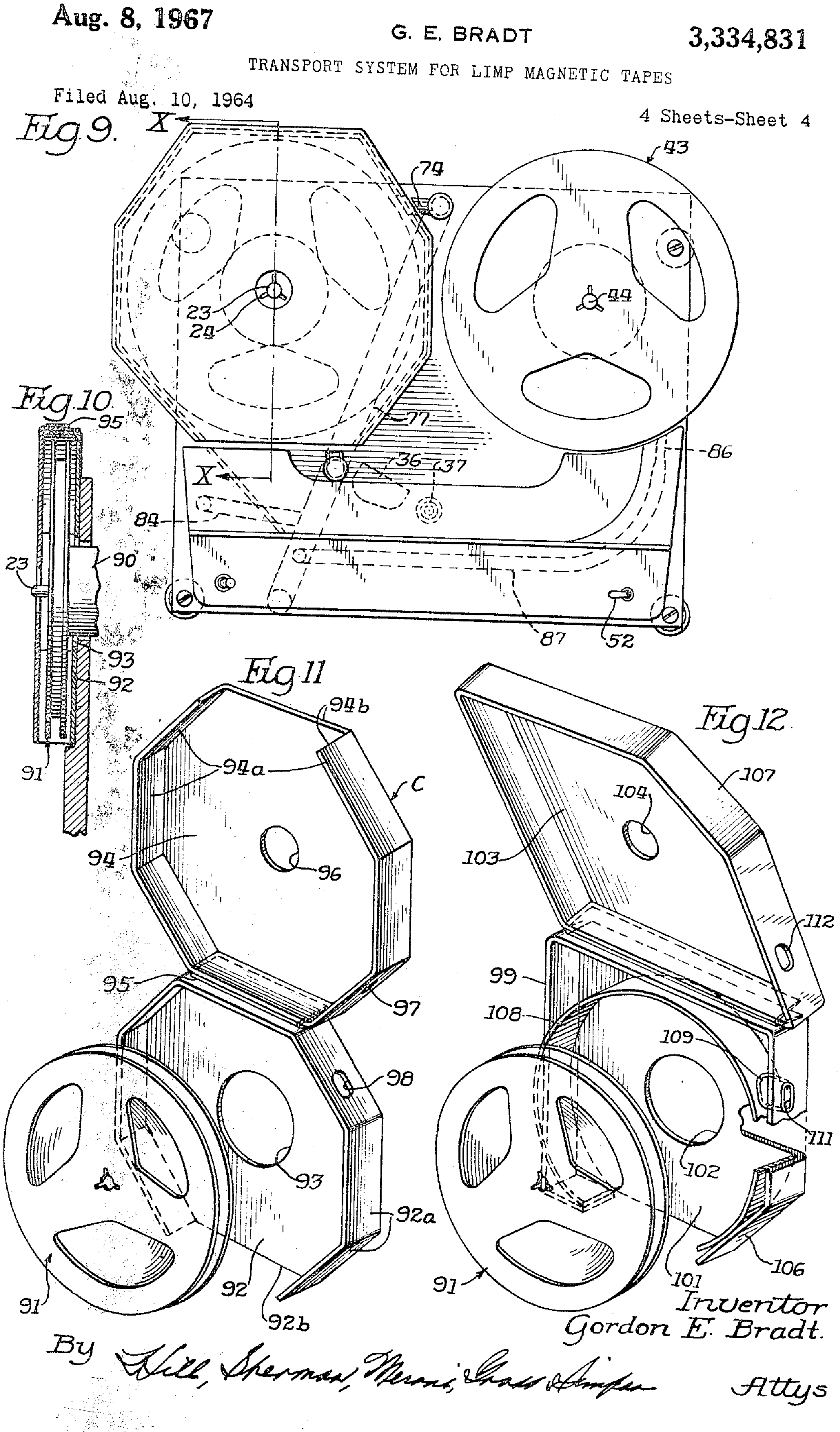
FIGURE 9 is a plan view of a modified form of the invention employing an improved type of container especially adapted for use with the improved transport system.
FIGURE 10 is a cross-sectional view taken substantially along the line X—X of FIG. 9.
FIGURE 11 is an exploded view of the container and reel assembly shown in FIGURE 9.
FIGURE 12 is an exploded view of a modified form of container which may be employed with the system of the present invention.

Referring now to FIGURES 9–11, there is disclosed a container structure by means of which the necessity of a separate scroll 31 is eliminated and wherein the reels of tape can be carried for display and sale and subsequently for storage and usage with the pneumatic threading system of the invention. In the form of the invention shown in FIGURE 11, a conventional supply reel 91 is loosely received within a container C of generally octagonal configuration. The container includes a bottom wall or base 92 having a central aperture 93 sized to be sufficiently large to fit over a collar 90 forming part of the spindle assembly for the spindle 23, as best illustrated in FIGURE 10. The bottom wall 92 has upstanding side walls 92a arranged in the octagonal form to be of equal dimensions. One of the side wall segments may be formed with a tape opening or may be omitted completely as at 92b to provide such an opening. Another one of the side wall segments 92a is formed with an opening 98 through which the jet stream $J_1$ is directed. The octagonal configuration of the box forms a scroll so the inside surface of the side walls form a scroll or rim surface for directing the air stream.

The container also includes a top wall or cover 94 having a relatively small aperture 96 disposed therein in coaxial relation with the aperture 93 when the container is closed about the reel 91 to accommodate the take-up spindle 23. The cover 94 is provided with upstanding side walls 94a arranged in octagonal disposition. A corresponding segment is apertured or omitted as at 94b to form a tape opening and another corresponding side wall segment is apertured as at 97 to admit the jet stream $J_1$ into the box C. A flexible hinge 95 interconnects the cover 94 to the base 92 in hinged relation. As best seen in FIGURE 10, when the reel 91 rests on the collar 90, the reel will be elevated from the bottom wall 92 which rests on the top of the deck and the reel 91 is freely supported within the container C for rotation therein without touching the sides. The octagonal shape of the container makes it unnecessary to provide any additional air channeling means, since the walls of the container themselves accomplish a baffling function.

The rest of the assembly shown in FIGURE 9 such as the take-up reel 43 and the various air jets are the same as previously described in connection with the preceding figures.

In the form of container shown in FIGURE 12 of the drawings (a bottom portion 99 having a base 101 is provided with a relatively large aperture 102. The top 103 has an aperture 104 of smaller dimension coaxial with the aperture 102. The container is of generally square configuration, except for an angular clearance side 106 for clearing the transducer head and a corresponding angular side 107 on the top portion.

In order to baffle the flow of air in the box or container of FIGURE 12 a scroll 108 composed of paper or the like is disposed in the container about the periphery of the reel 91 and serves to confine the air path from the orifice 74 to the periphery of the tape wound therearound. A slot 109 is provided in the scroll 108 to register with the slot 111 in the bottom portion and a slot 112 in the cover portion of the container so that there will be free access to the air stream $J_1$ issuing from the orifice 74. In all other respects, the container shown in FIGURE 12 operates in the same manner as that shown in FIGURE 11, and makes it unnecessary to employ a separate scroll 31.

From the foregoing, it will be understood that the system of the present invention provides an automatic threading mechanism for limp elongated tapes which makes use of relatively inexpensive components, but still provides a highly effective automatic threading action. The tape is not subjected to substantial stress during the threading operation, making it highly unlikely that the tape would be broken during threading.

It should be evident that various modifications can be made to the described embodiment without departing from the scope of the present invention.

I claim as my invention:

1. A tape container for reeled tape having upper, lower and side walls, said side walls having formed therein an air opening through which a controlled jet of air may be directed and a tape opening through which the free end of the tape is directed, and including a separate scroll inserted in said container outwardly of the tape to baffle the flow of air generally peripherally with respect to the tape, whereby the tape may be used without removing the tape reel from the container.

2. The method of transporting a relatively limp elongated flexible tape supplied in a coil, the outermost winding of which terminates in a leading end, which includes the steps of:

directing at least one jet of air at the outermost winding of said coil to strip the leading end of the tape from the remaining windings of the coil;

directing successive driving jets of air at a loci of spaced apart points prescribing a path; and feeding the leading end of the tape successively into the jets for guidance and propulsion thereby.

3. The method of claim 1 including the steps of:

initially rotating said coil of tape in a direction to make adjacent windings of said coil taut against one another, and wherein said feeding step comprises:

rotating said coil of tape in a direction to unwind the leading end of said tape from said remaining windings while directing a jet of air toward said coil of tape;

whereby all of the windings except the outer stripped winding will remain wrapped in a tight coil while said step of stripping is being performed.

4. The method of claim 1 wherein the step of feeding includes the step of rotating the coil in a direction for unwinding a length of tape therefrom, and, wherein the rotating step and the step of directing said at least one jet of air to strip the leading end of the tape from the coil are performed simultaneously, and including the additional simultaneous step of directing a jet of air toward said coil tending to keep the outer tape winding wrapped about the coil.

5. The method of claim 2 wherein a take-up hub is provided at the end of the prescribed path over which the leading end of the tape is guided, and including the steps of:

creating a reduced air pressure at said hub; and attaching the leading end of said tape to said hub by said reduced pressure.

6. The method of claim 2 wherein said coil is supplied on a supply reel, and said leading end is directed toward a take-up member and including the steps of:

drawing air into a system through the take-up member thereby creating a reduced pressure in the vicinity of said take-up member;

circulating said air under pressure to said air jet means to drive said tape toward the take-up; and attaching the tape to the take-up member by said reduced pressure.

7. The method of claim 2 wherein a take-up reel with a hub is positioned to receive the tape from the coil;

said feeding step including the step of directing the leading end of the tape toward the hub of the take-up reel by the last of said successive driving jets.

8. A threading system for a limp tape comprising:

a tape supply means to support a coil of limp tape, the outermost winding of the tape terminating in a leading end;

a take-up means; and a plurality of air jet means directed toward the outermost winding of said tape for peeling the leading end of the tape from said coil; and for propelling the end of the tape away from said tape supply means in the direction of said take-up means at the initiation of a threading operation.

9. The threading system of claim 8 including:

a guide means forming a path from said supply means to said take-up means along which said leading end is propelled by said air jet means.

10. The system of claim 8 including:

a support means for rotating said coil of tape, and wherein one of said plurality of air jet means is positioned to direct a jet of air in a direction tending to keep the outer winding of tape wrapped tightly on said coil when said coil is rotated while said peeling air jet means is directing a jet of air at said coil of tape to peel said leading end from the balance of said windings.

11. The threading system of claim 9 wherein said take-up means is a reel having a hub and including:

means for providing a reduced air pressure area at the hub of said reel to hold said tape leading end securely against the hub.

12. The system of claim 8 wherein said coil of tape is wound on a supply reel and loaded into a container, said container having openings therein for permitting said jets of air to contact said tape.

13. The system of claim 10 which includes a detachably secured rim positioned to surround said coil of tape to confine the air jet streams therearound.

14. The system of claim 12 wherein said container includes:

a scroll about the periphery of said reel and interposed between said reel and the outer walls of the container, said scroll having openings therein in registry with said container openings and said air jet means to permit directing an air jet stream against the coil of tape on said reel, said scroll substantially confining the movement of said limp tape by said stream.

15. The threading system of claim 9 wherein at least one of said plurality of air jet means transports the leading end of said tape to said take-up means.

16. The threading system of claim 11 in which said supply means comprises a container in which a supply reel carrying said coil of limp tape is loosely received;

means to rotate said supply reel; and means for drawing air from said reduced pressure area and circulating said air under pressure to said air jet means, whereby said tape leading end is influenced by said jet air streams of said air jet means and propelled thereby along said guide means into the vicinity of said reel where it is subsequently caused by said reduced pressure to be securely held against said hub.

17. The threading system of claim 16 wherein one of said air jet means is positioned adjacent the take-up reel end of said guide means and directed so as to guide said leading end proximate the hub of said take-up reel.

18. In a threading system for a limp tape as in claim 8 wherein said tape supply means is a tape container for reeled tape having upper, lower and side walls, said side walls having formed therein an air opening through which a controlled jet of air may be directed and a tape opening through which the free end of the tape is directed, whereby the tape may be used without removing the tape reel from the container.

References Cited

UNITED STATES PATENTS

| | | | |
|---|---|---|---|
| 3,006,650 | 10/1961 | Ellmore | 242—55.13 |
| 3,008,661 | 11/1961 | Estes et al. | 242—55.13 |
| 3,083,925 | 4/1963 | Schoebel | 242—55.13 |
| 3,092,346 | 6/1963 | Goodell et al. | 242—71 X |
| 3,127,120 | 3/1964 | Selsted et al. | 242—55 |
| 3,134,527 | 5/1964 | Willis | 226—97 |

FRANK J. COHEN, *Primary Examiner.*

G. F. MAUTZ, *Assistant Examiner.*

UNITED STATES PATENT OFFICE

CERTIFICATE OF CORRECTION

Patent No. 3,334,831 August 8, 1967

Gordon E. Bradt

It is certified that error appears in the above identified patent and that said Letters Patent are hereby corrected as shown below:

Column 7, lines 8 and 19, claim reference numeral "1", each occurrence, should read -- 2 --. Column 8, line 11, claim reference numeral "8" should read -- 10 --.

Signed and sealed this 29th day of July 1969.

(SEAL)
Attest:

Edward M. Fletcher, Jr.
Attesting Officer

WILLIAM E. SCHUYLER, JR.
Commissioner of Patents